(12) United States Patent
Penton et al.

(10) Patent No.: US 8,661,232 B2
(45) Date of Patent: Feb. 25, 2014

(54) REGISTER STATE SAVING AND RESTORING

(75) Inventors: Antony John Penton, Cambridge (GB); Simon Axford, Cambridge (GB)

(73) Assignee: ARM Limited, Cambridge (GB)

( * ) Notice: Subject to any disclaimer, the term of this patent is extended or adjusted under 35 U.S.C. 154(b) by 789 days.

(21) Appl. No.: 12/923,357

(22) Filed: Sep. 16, 2010

(65) Prior Publication Data

US 2011/0093686 A1    Apr. 21, 2011

(30) Foreign Application Priority Data

Oct. 19, 2009  (GB) .................................. 0918298.1

(51) Int. Cl.
  *G06F 11/00*  (2006.01)

(52) U.S. Cl.
  USPC .......................................... 712/228; 712/244

(58) Field of Classification Search
  None
  See application file for complete search history.

(56) References Cited

U.S. PATENT DOCUMENTS

| | | | |
|---|---|---|---|
| 3,974,480 A | | 8/1976 | Gernelle |
| 5,283,891 A | * | 2/1994 | Suzuki et al. .................... 714/45 |
| 5,398,330 A | * | 3/1995 | Johnson ........................... 714/15 |
| 5,860,014 A | | 1/1999 | Cheong et al. |
| 5,905,881 A | | 5/1999 | Tran et al. |
| 6,178,499 B1 | | 1/2001 | Stotzer et al. |
| 6,434,743 B1 | * | 8/2002 | Click et al. ..................... 717/157 |
| 8,516,502 B2 | * | 8/2013 | Chauvel et al. ............... 719/318 |
| 2002/0066004 A1 | * | 5/2002 | Nevill et al. ................... 712/209 |
| 2004/0093486 A1 | * | 5/2004 | Zahir et al. ..................... 712/228 |
| 2005/0050386 A1 | * | 3/2005 | Reinhardt et al. ............... 714/13 |
| 2006/0149940 A1 | | 7/2006 | Mukherjee |

OTHER PUBLICATIONS

Settle, A. etal., Optimization for the Intel Itanium Architecture Register Stack, 2003, IEEE, Proceedings of the Intl. Symposium on Code Generation and Optimization (CGO '03), 10 pages.*
Search Report for UK 0918298.1 dated Jan. 26, 2010.

* cited by examiner

*Primary Examiner* — Eric Coleman
(74) *Attorney, Agent, or Firm* — Nixon & Vanderhye P.C.

(57) ABSTRACT

In a data processing apparatus 1 having registers 6, when a state saving trigger event occurs while a result value of a data processing operation is still to be written to a destination register then saving and restoring control circuitry 12 selects a state saving sequence defining a temporal order for saving register values to a backup data store 10. The sequence is selected to provide the destination register with a position within the sequence corresponding to a time after the result value has been written to the destination register. The register values are then saved to the backup data store 10 in the order of the selected state saving sequence. A similar technique can be used when a state restoring trigger event triggers loading of the data values from the backup data store 10 to the registers 6.

35 Claims, 8 Drawing Sheets

REGISTER STATE SAVING AND RESTORING

This application claims priority to GB Application No. 0918298.1 filed 19 Oct. 2009, the entire contents of which are incorporated herein by reference.

BACKGROUND OF THE INVENTION

1. Field of the Invention

The present invention relates to the field of data processing. In particular, the invention relates to saving register values from registers to a backup data store, and restoring the register values from the backup data store to the registers.

2. Background to the Invention

A data processing apparatus may have a set of registers for storing data values used by the processor during processing. The register values represent the current state of the processor. When the processing apparatus encounters a context switch, then at least some of the register values stored in the registers may be stored to a backup data store. Following the change of context, different register values may be stored in the registers. When the process associated with the context switch has finished, the original register values may be restored to the registers in order to complete execution of the process which was interrupted by the context switch.

On occurrence of an event which triggers the saving of register state to the backup data store (e.g. an exception event), a currently executing operation may not yet have completed. The operation may take a number of processing cycles to execute. If the operation writes a result value to one of the registers, and the state saving operation is started before the currently executing operation has completed, then the register state written to the backup data store may not include the recently calculated result value. This means that processing errors may occur after restoring the state data. Data dependency hazards, where a value of a register is read before the result value is written to the register, should be avoided.

It is generally desirable that the time between the occurrence of the state saving trigger event and the end of the state saving process is predictable. This is especially the case in safety-critical systems, such as car braking systems, where it is important that the interrupt latency is constant and short. If the currently executing operation was allowed to complete before starting the state saving operation, then the data dependency hazard would be avoided. However, since the state saving trigger event may have occurred at any point during the execution of the currently executing operation, the delay in starting the state saving process will vary depending on the execution point at which the trigger event occurred and so it is difficult to predict how long it will take before all of the state data is saved to the backup data store. Allowing execution of the currently executing operation to complete before starting the state saving operation would also increase the interrupt latency. Therefore, starting the state saving operation only after the currently executing operation is complete is not appropriate in many systems.

Another way of avoiding data dependency hazards is to abandon the currently executing instruction midway through its execution on occurrence of a state saving trigger event. However, this option suffers from the disadvantage that after the state is restored the abandoned instruction will need to be executed again in its entirety, and so this slows the forward progress of program execution by the processing apparatus. Furthermore, the abandoned instruction may not be idempotent.

These techniques each suffer from one of the following disadvantages: data dependency hazards, unpredictable and slow exception handling latency, and slow processing after restoring the register state. The present invention seeks to provide an improved state saving and restoring mechanism which avoids data dependency hazards, has a predictable latency, and does not delay processing after the state has been restored to the registers.

SUMMARY OF INVENTION

According to one aspect, the present invention provides a data processing apparatus comprising:
  data processing circuitry for executing a data processing operation for generating a result value;
  a plurality of registers for storing a plurality of register values, one of said plurality of registers being a destination register for storing said result value generated during execution of said data processing operation by said data processing circuitry;
  a backup data store for storing a backup copy of a subset of said plurality of register values; and
  state saving control circuitry responsive to an occurrence of a state saving trigger event while said result value is still to be written to said destination register to:
    (i) detect which of said plurality of registers is said destination register;
    (ii) select a state saving sequence defining a temporal order for saving each of said subset of register values to said backup data store, said state saving control circuitry selecting said state saving sequence in dependence on which of said plurality of registers is said destination register to provide said destination register with a position within said state saving sequence corresponding to a time after said result value has been written to said destination register by said data processing circuitry; and
    (iii) after selecting said state saving sequence, save each of said subset of register values to said backup data store in the order of the selected state saving sequence.

When a state saving trigger event occurs while a result value of a currently executing data processing operation is still to be written to a destination register, the state saving control circuitry of the present technique responds by saving a subset of register values to a backup data store. The present technique recognises that by selecting an appropriate temporal order for saving each of the subset of register values to the backup data store, the result value generated during execution of the data processing operation will be written to the destination register before the value of the destination register is saved to the backup data store. Thus, data dependency hazards are avoided and the correct value of the destination register is saved. Since the state saving operation may begin while the data processing operation is still executing, the latency associated with the state saving operation is short, constant and predictable because the end of the state saving is not dependent on the execution point at which the state saving trigger event occurred. Processing of the currently executing data processing operation is not abandoned when the state saving trigger event occurs and so on restoration of the register values to the registers continued processing of the program being executed by the data processing circuitry will be quicker because the data processing operation does not need to be executed again and the problem of non-idempotent instructions does not arise.

The subset of register values saved to the backup data store may be only some of the registers stored in the plurality of registers, with others of the registers not being saved on occurrence of the state saving trigger event. Alternatively, the subset of register values may be all of the register values stored in the plurality of registers.

In a further feature, a physical order in which the subset register values are stored in the backup data store may be independent of the temporal order for saving the subset of register values defined by the state saving sequence. For example, the register values may be stored in the same physical locations within the backup data store regardless of the temporal order defined by the selected state saving sequence. Since the physical storage order of the subset of register values is not dependent on the temporal order in which they were saved, restoration of the register values is simplified since at the time of restoration there is no need to know the temporal order with which the values were written to the backup data store.

The state saving trigger event may be a function call. When executing a first sequence of data processing operations, a function call can occur indicating that execution of the first sequence of operations should be suspended and execution of a second sequence of processing operations should begin. To enable the processing of the first sequence to continue once the second sequence has finished, the function call is used as a state saving trigger event to initiate saving of register values associated with the first sequence to the backup data store.

The state saving trigger event may also be an interrupt request. The interrupt request indicates that processing of the current processing operation should be suspended and processing of an interrupt handling routine should begin. When the interrupt request occurs, state saving is initiated. Once execution of the interrupt handling routine is complete, then an interrupted data processing operation can resume using state data restored from the backup data store.

The state saving trigger event may also be the execution of a store multiple operation by the data processing circuitry, at least one value to be stored being the register value of the destination register. A store multiple operation controls the storage of a block of register values to the backup data store. When one of a block of two or more register values is the register value of the destination register, then the present technique may be used to control the temporal order in which the register values are written to the backup data store. By appropriately selecting the temporal order for storing the values, the store multiple operation may begin execution before completion of a previous data processing operation that writes a result value to the destination register. The destination register is provided with a position within the store multiple sequence so that it is saved to the backup data store after the result value of the previously executing data processing operation has been written to the destination register.

In a further feature, at least one register other than the destination register may have an earlier position in the state saving sequence than the destination register. By saving the register values of at least one register other than the destination register before saving the value of the destination register, then this provides time for the execution of the currently executing data processing operation to complete before the value of the destination register is saved.

In a further feature of the present technique, the subset of registers may comprise a plurality of groups of registers, and the state saving control circuitry may be configured to provide the registers of at least one group of registers not including the destination register with earlier positions in the state saving sequence than the registers of the group of registers that includes the destination register.

The subset of registers whose contents is to be saved may be logically divided into a plurality of groups (although not necessarily physically divided into separate blocks of registers—the groups may be different sets of registers within a single register bank). When choosing a state saving sequence, the state saving control circuitry may arrange the sequence so that the registers of at least one group that does not include the destination register have earlier positions in the state saving sequence than the registers of the group that includes the destination register. This helps to provide the destination register with a position within the state saving sequence that is late enough to ensure that the currently executing data processing operation writes the result value to the destination register before the value of the destination register is saved to the backup data store.

The plurality of groups of registers may comprise two groups of registers. In this case, the state saving control circuitry selects the state saving sequence so that the register values of the group of registers not including the destination register are saved to the backup data store before the register values of the group of registers that includes the destination register. Providing only two groups means that data dependency hazards can be prevented using relatively simple processing logic. The circuitry for selecting the state saving sequence and generating the appropriate addresses for use within the backup data store is not complex as there are only two possible state saving sequences.

The data processing circuitry may execute a plurality of data processing operations and generate a plurality of result values to be stored in a plurality of destination registers. In this case, the subset of registers may comprise a plurality of groups of registers, and the state saving control circuitry may provide the registers of at least one group of registers not including any of the plurality of destination register with earlier positions within the state saving sequence than the registers of all groups of registers that include at least one of the plurality of destination registers.

If more than one destination register is being used, then the sequence is selected so that at least one group of registers that does not include any of the destination registers are earlier in the sequence than the groups of registers including at least one destination register. This means that the values of the destination registers can be stored to the backup data store after the result values have been written to the respective destination registers.

In any of the above techniques for choosing the state saving sequence, the state saving control circuitry may be configured to provide consecutive registers of the same one of the groups of registers for its positions in the state saving sequence. This simplifies the selection of the state saving sequence simple since consecutive addresses can be used for accessing the register values of a same group in the backup data store.

Another technique is to select as the selected state saving sequence a cyclic sequence of registers ending with the destination register. For example, the sequence could begin with a register after the destination register and proceed to the end of the plurality of registers before returning to the beginning of the set of registers and continuing until the destination register. This ensures that the destination register is the last register to be saved to the backup data store, while still having a mostly consecutive sequence of registers. By saving the value of the destination register to the backup data store last, this provides more time for the currently executing data processing operation to complete and write its result value to the destination register before the value of the destination register is saved to the backup data store. Also, by providing a largely consecutive sequence of registers (the only non-consecutive point being the point at which the sequence wraps around from the end of the plurality of registers to the beginning of the plurality of registers), the logic and circuitry for selecting the selected state saving sequence and controlling the state saving is relatively simple. A reverse cyclic sequence could also be used in which the cyclic sequence begins with the register preceding the destination register, continues to the start of the registers, wraps around to the end of the register file, and then returns to the destination register.

The state saving control circuitry may be hardware-controlled. By providing hardware which automatically triggers the state saving operation when a state saving trigger event occurs, state saving is started more quickly than if this function was software-controlled. Software-controlled state saving is typically slower than hardware and requires more instructions.

The backup data store may be a memory. In particular, a stack memory may be used.

The backup data store may be a further plurality of registers which stores the register values of the corresponding plurality of registers.

Although the present technique may be applied when any data processing operation is interrupted by a state saving trigger event, the present technique is particularly useful when the data processing operation is one of a floating point divide operation and a floating point square root operation. This is because these operations take a relatively long time to execute and so data dependency hazards are more likely for these operations than for operations having a shorter execution time.

Other data processing operations to which the present technique may be applied include integer divide or square root operations, double or extended precision floating point operations, integer or floating point multiply accumulate operations, trigonometric operations and reciprocal operations.

As described above, the present technique does not abandon execution of the currently executing operation when a state saving trigger event occurs. In some situations, it may be important that executing data processing operations are not abandoned, and so the present technique is particularly useful in those situations. One example of this is where a data processing circuitry comprises at least two processing pipelines for executing data processing operations in parallel with one another, and the data processing circuitry is configured to issue data processing operations to the at least two processing pipelines in order, but to complete execution of the issued data processing operations out of order if one of the processing pipelines executes a later-issued data processing operation more rapidly then another of the data processing pipelines executes an earlier-issued processing operation. In such a system, it is possible that when the state saving trigger event occurs a later-issued data processing operation has already completed and written its result value to the registers, while an earlier-issued data processing operation has not yet completed. If at this point state saving is initiated then the saved state in the backup data store would include a result value produced by the later-issued data processing operation, but not a result value produced by the earlier-issued data processing operation. Therefore, even if state is restored and the earlier-issued data processing operation is restarted, the final result may not be correct as the earlier-issued data processing operation may erroneously use the result value of the later-issued data processing operation rather than an earlier register value which was stored before the later-issued data processing operation was executed. For processing systems having out-of-order completion, the present technique is useful because it enables the earlier-issued (but later-completed) data processing operation to complete and write its result value to the destination register before the destination register value is saved to the backup data store.

The plurality of registers do not need to be the only set of registers. For example, in a system having both integer processing and floating point processing capabilities, there may be a set of integer registers for storing integer register values and a set of floating point registers for storing floating point register values. In such a system, the present technique need not be applied to both sets of registers. For example, the state saving control circuitry may be responsive to the state saving trigger event to save at least a subset of the integer register values to the backup data store in a temporal order independent of the state saving sequence, while the floating point register values are stored in accordance with the state saving sequence. This is useful because the floating point operations generally take longer to execute than the integer operations and so the present technique is more useful for saving the values of the floating point registers.

Viewed from another aspect, the present invention provides a data processing method comprising the steps of:

executing a data processing operation for generating a result value to be stored in a destination register, said destination register being one of a plurality of registers for storing a plurality of register values; and upon occurrence of a state saving trigger event while said result value is still to be written to said destination register:

(i) detecting which of said plurality of registers is said destination register;

(ii) selecting a state saving sequence defining a temporal order for saving each of a subset of said plurality of register values to a backup data store, said state saving sequence being selected in dependence on which of said plurality of registers is said destination register to provide said destination register with a position within said state saving sequence corresponding to a time after said result value has been written to said destination register; and (iii) after selecting said state saving sequence, saving each of said subset of register values to said backup data store in the order of the selected state saving sequence.

Viewed from yet another aspect, the present invention provides a data processing apparatus comprising:

data processing circuitry for executing a data processing operation for generating a result value;

a plurality of registers for storing a plurality of register values, one of said plurality of registers being a destination register for storing said result value generated by said data processing circuitry;

a backup data store for storing a backup copy of a subset of said plurality of register values; and state restoring control circuitry responsive to an occurrence of a state restoring trigger event while said result value is still to be written to said destination register to:

(i) detect which of said plurality of registers is said destination register;

(ii) select a state restoring sequence defining a temporal order for loading each of said subset of register values stored in said backup data store to said registers, said state restoring control circuitry selecting said state restoring sequence in dependence on which of said plurality of registers is said destination register to provide said destination register with a position within said state restoring sequence corresponding to a time after said result value has been written to said destination register; and (iii) after selecting said state restoring sequence, load each of said subset of register values from said backup data store to said registers in the order of the selected state restoring sequence.

In the technique described above, the temporal order in which register values are saved to a backup data store is controlled in dependence on which of the registers is the destination register. When register values have been saved to the backup data store, the restoration of the backed up register values may be controlled in a similar way. When data is restored to the registers while a currently executing operation is still to write a result value to the destination register, then it is important that the result value is written to the destination register before a register value is restored to the destination register, otherwise the restored register state will not be the same as the state that was stored in the backup data store. Therefore, the state restoring control circuitry selects a state restoring sequence defining a temporal order for loading each of the subset of register values to the registers. The state restoring sequence is selected in dependence on which of the plurality of registers is the destination register, so as to provide the destination register with a position within the state restoring sequence that corresponds to a time after the result value has been written to the destination register. This means that the backed up state is correctly restored and is not subsequently overwritten by the result value of the data processing operation that was partially executed when the state restore trigger event occurred.

The state restoring trigger event may be a return from execution of a function call. This means that the state associated with a process being executed before the function call occurred is restored to the registers.

The state restoring trigger event may be a return from execution of an interrupt handling process. This means that the register values associated with the process being executed before the occurrence of the interrupted event is restored to the registers.

The state restoring trigger event may also be the execution of a load multiple operation where at least one value is to be loaded to the destination register. The load multiple operation will not be executed correctly if a value loaded to the destination register is subsequently overwritten by a data processing operation that had been partially executed when the load multiple operation was started. When the load multiple operation loads a block of at least two values to the registers, and at least one of the values is to be loaded to the destination register, then the present technique can be used to select the temporal order in which the at least two data values are loaded to the registers so that the at least one value to be loaded to the destination register is loaded after the currently executing processing operation has written the result value to the destination register.

The state restoring sequence may be selected so that at least one register other than the destination register has an earlier position in the sequence than the destination register. This provides time for the currently executing data processing operation to complete before a backed up register value is restored to the destination register.

The subset of registers may comprise a plurality of groups of registers and the state restoring circuitry may be configured to provide the registers of at least one group of registers not including the destination register with earlier positions in the state restoring sequence than the registers of the group of registers that includes the destination register. Arranging the sequence in this way simplifies the selection of the restoring sequence.

The state restoring control circuitry may be further simplified by providing two groups of registers as the plurality of groups of registers. In this case, there are only two possible state restoring sequences (either the first group followed by the second group, or the second group followed by the first group). Therefore, selection of one of the two sequences is simple.

Where the data processing circuitry executes a plurality of data processing operations for generating a plurality of result values to be stored in a plurality of destination registers, the registers may be arranged in a plurality of groups and the state restoring control circuitry may be configured to provide the registers of at least one group of registers not including any of the destination registers with earlier positions in the state restoring sequence than the registers of all groups of registers that include at least one of the destination registers. Thus, at least some non-destination registers are positioned early in the sequence and so any destination registers are therefore positioned later, thus helping to avoid data dependency hazards.

To simplify the selection of the state restoring sequence (and the generation of a sequence of addresses identifying the locations within the backup data store from which the register values are to be loaded), the state control circuitry may be configured to provide consecutive registers of a same one of the groups of registers with consecutive positions within the state restoring sequence.

The selected state restoring sequence may be a cyclic sequence of registers ending with the destination register. This provides more time before the register value is restored to the destination register.

The state restoring control circuitry may be hardware-controlled. This means that the response to the state restore trigger event can be quicker than if the state restoring operation was software-controlled.

The backup data store may be a memory or a further plurality of registers.

The data processing operation may be one of a floating point divide operation and a floating point square root operation. The present technique is particularly useful for these operations because they take a relatively long time to execute.

In a further feature, the data processing circuitry comprises at least two processing pipelines for executing data processing operations in parallel with one another; and said data processing circuitry is configured to issue data processing operations to said at least two processing pipelines in order, but to complete execution of the issued data processing operations out of order if one of said processing pipelines executes a later-issued data processing operation more quickly than another of said processing pipelines executes an earlier-issued data processing operation.

The present technique is useful in processors having out of order completion because in such processors it may not be appropriate to abandon execution of a currently executing instruction, for the reasons explained above in relation to the state saving technique.

Where there are separate registers used for storing integer register values and floating point register values, the present technique may be applied only to the floating point registers, the integer register values being loaded in a temporal order independent of the state restoring sequence.

Viewed from a further aspect, the present invention provides a data processing method comprising the steps of:
  executing a data processing operation for generating a result value to be stored in a destination register, said destination register being one of a plurality of registers; and upon occurrence of a state restoring trigger event while said result value is still to be written to said destination register:

(i) detecting which of said plurality of registers is said destination register;

(ii) selecting a state restoring sequence defining a temporal order for loading each of a subset of said plurality of register values stored in a backup data store to said registers, said state restoring sequence being selected in dependence on which of said plurality of registers is said destination register to provide said destination register with a position within said state restoring sequence corresponding to a time after said result value has been written to said destination register; and (iii) after selecting said state restoring sequence, loading each of said subset of register values from said backup data store to said registers in the order of the selected state restoring sequence.

The above, and other, objects, features and advantages of this invention will be apparent from the following detailed description of illustrative embodiments which is to be read in connection with the accompanying drawings.

DETAILED DESCRIPTION OF THE INVENTION

Figure 1:
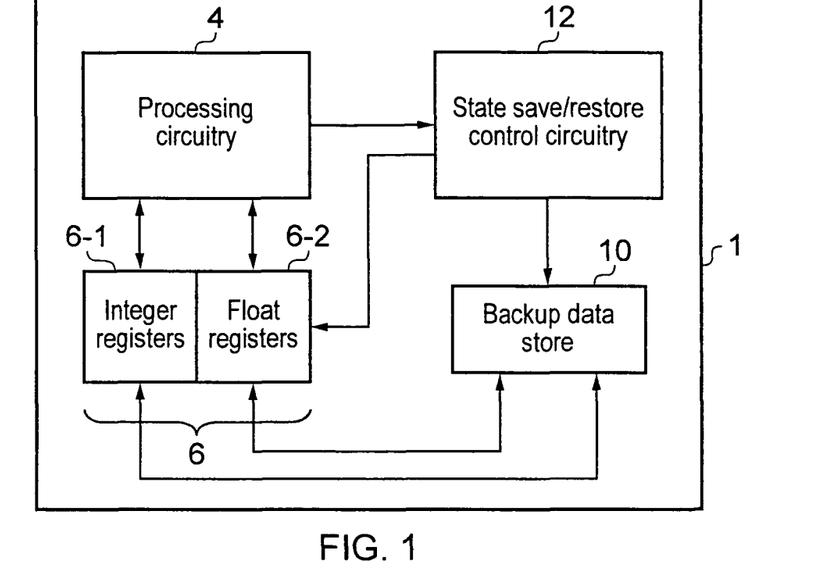
FIG. 1 schematically illustrates a data processing apparatus for saving register values to a backup data store and restoring register values saved in the backup data store to registers.

FIG. 1 shows a data processing apparatus 1 comprising processing circuitry 4 for processing data processing operations. At least one bank of registers 6 is provided to store data values used and generated by the processing circuitry 4 during execution of data processing operations. In the example of FIG. 1, the registers 6 include integer registers 6-1 and floating point registers 6-2. The integer registers 6-1 store integer data values, while the floating point registers 6-2 store floating point data values. Where it is not important to distinguish between the integer registers 6-1 and the floating point registers 6-2, the reference numeral 6 will be used to indicate the registers.

A backup data store 10 is provided to store backup copies of data values from the registers 6. The backup data store 10 may also store instructions to be executed by the processing circuitry 4 (although there could be provided a separate instruction memory not illustrated in FIG. 1). The backup data store 10 may be responsive to a store or load instruction to store data from the registers 6 or load data to the registers 6.

On occurrence of a state saving trigger event, the contents of at least a subset of the registers 6 may be stored to the backup data store 10 (the subset of registers can include all, or only some, of the registers 6). Similarly, on occurrence of a state restoring trigger event, register values previously stored in the backup data store 10 may be loaded to a subset of the registers 6.

State saving and restoring control circuitry 12 is provided to control the saving and restoring processes. While the state saving and restoring control circuitry 12 is shown as a single circuitry in FIG. 1, it will be appreciated that separate circuits may be provided to perform the respective saving and restoring operations. The state saving and restoring control circuitry 12 is hardware-controlled to respond automatically to a state saving trigger event by saving register values of the registers 6 to the backup data store 10, and to respond to a state restoring trigger event by loading register values stored in the backup data store 10 to the registers 6. Since the state saving and restoring circuitry 12 is hardware-controlled, it does not need to invoke any program stored in memory in order to respond to the state saving trigger event, or state restoring trigger event and so this hard-wired response to these events is quicker than if software-controlled circuitry was used.

Figure 2:
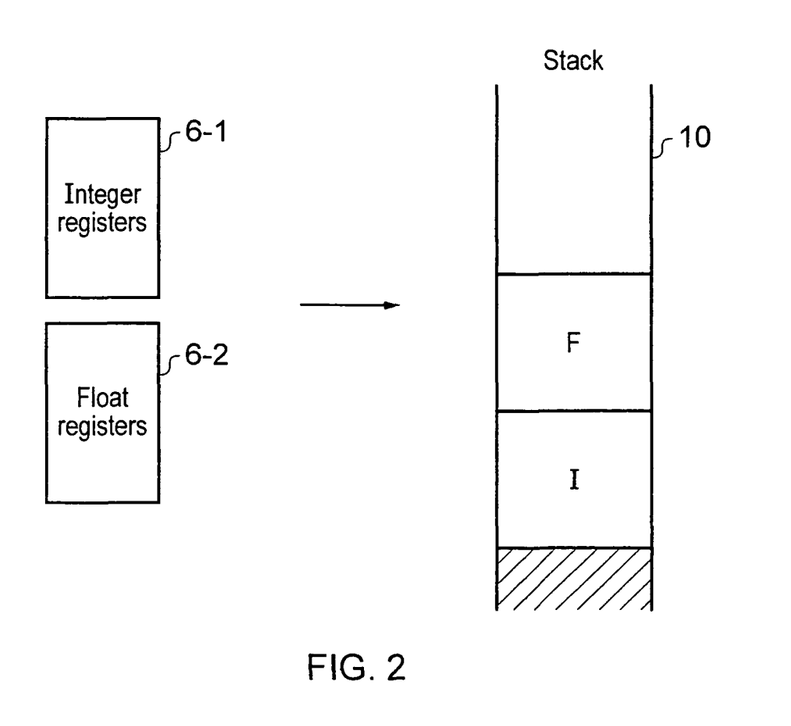
FIG. 2 schematically illustrates the saving of register values to a stack memory.

The backup data store 10 may be a second set of registers provided in addition to the registers 6. Alternatively, the backup data store may be a memory. FIG. 2 shows an example in which the backup data store 10 is a stack memory.

Figure 3:
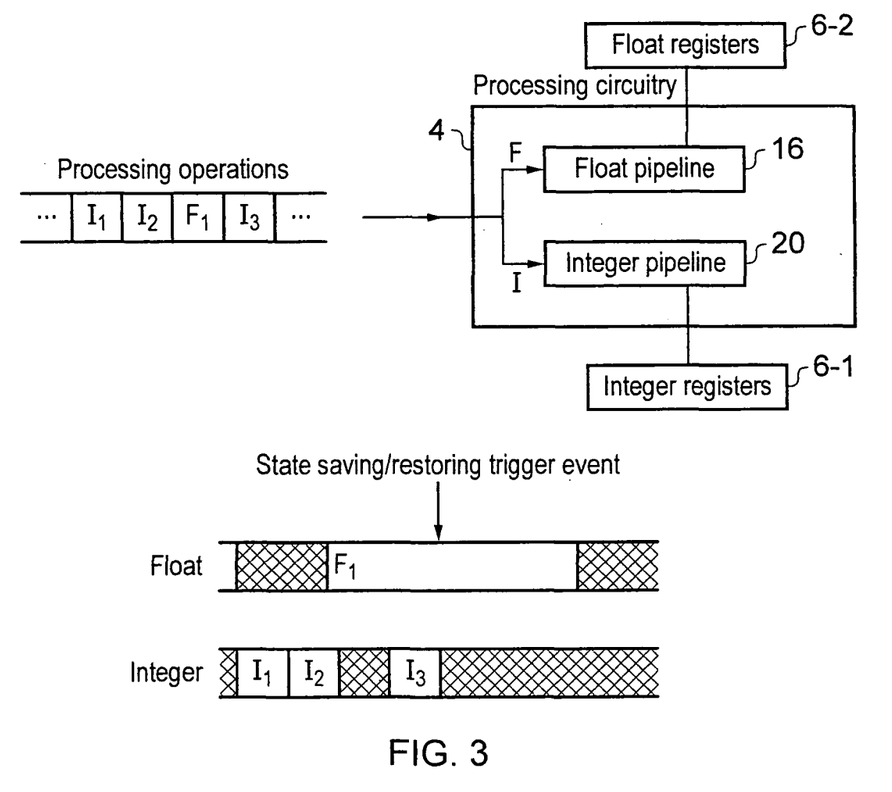
FIG. 3 schematically illustrates an example of in order issuing, and out of order completion, of floating point and integer operations by a processing apparatus.

FIG. 3 shows an example of the operation of the processing circuitry 4. The processing circuitry 4 includes a floating point pipeline 16 and an integer pipeline 20. The floating point pipeline 16 processes floating point processing operations using the floating point registers 6-2, while the integer pipeline 20 processes integer processing operations using the integer registers 6-1. In the example of FIG. 3, processing operations are issued in order, but may be completed out of order. This can be seen in FIG. 3 in which, for example, integer operations $I_1$ and $I_2$, a floating point operation $F_1$, and another integer operation $I_3$ are issued in that order to the processing circuitry 4. As can be seen at the bottom of FIG. 3, these operations are issued to the processor in order ($I_1$, $I_2$, $F_1$, $I_3$), but are completed out of order ($I_1$, $I_2$, $I_3$, $F_1$). This is because the floating point operation takes a longer time to execute than the integer operations. If a state saving or restoring trigger event occurs after completion of integer operation $I_3$, but before the completion of floating point operation $F_1$, then the integer registers 6-1 will correct up to the end of execution of operation $I_3$, while the floating point registers 6-2 are not yet up to date because the result value of floating point operation $F_1$ has not yet been written to the floating point registers 6-2. If the state saving or state restoring happens immediately, then it is possible that the result value of operation $F_1$ is not saved to the backup data store 10, or on restoring the result value of $F_1$ incorrectly overwrites a value restored from the backup data store 10. This means that the wrong state could be restored to the registers and so this can cause incorrect processing results.

To prevent these problems, the state saving and restoring control circuitry 12 controls the temporal order in which register values of the registers 6 are saved to the backup data store 10 or in which the register values are restored from the backup data store 10. As can be seen from FIG. 3, this problem is more likely to occur for the floating point registers 6-2 than the integer registers 6-1, because the floating point operations take longer to execute. Therefore, while the present technique may be applied to both the integer registers 6-2 and the floating point registers 6-1, it is also possible that the technique is only applied to the floating point registers 6-2, and that the temporal order of the integer registers 6-1 is not controlled (i.e. the same order is always used for the integer registers 6-1).

The state saving and restoring control circuitry 12 controls the temporal sequence with which register values of the registers 6 are saved to the backup data store 10 and restored from the backup data store 10. While it is possible that the state saving and restoring control circuitry 12 could select an order for each different type of currently executing data processing operation, it is most likely to be the floating point operations for which this technique is useful, and in particular the floating point divide operation and the floating point square root operation which are some of the instructions requiring the longest time to execute. Therefore, the state saving and restoring control circuitry 12 may, for example, allow the registers to be written in consecutive order for all operations other than the floating point divide and square root operations, while selecting a particular state saving/restoring sequence for the floating point divide and square root operations (i.e. when the state saving/restoring trigger event occurs during execution of the floating point divide or floating point executing operation).

A data processing operation such as the floating point operation $F_1$ writes a result value to a destination register. The state saving and restoring control circuitry 12 controls the sequence with which register values are stored to the backup data store 10 or restored from the backup data store 10, so that the destination register has a position within the state saving or restoring sequence which corresponds to a time after the result value has been written to the destination register. This means that, on saving state to the backup data store 10, the result value of the currently executing processing operation will be written to the backup data store 10 along with the rest of the contents of the registers 6. On restoring the data values from the backup data store 10, a currently executing data processing operation will be prevented from overwriting a restored value since the state restoring sequence will ensure that the result value will be written to the destination register before the value is restored from the backup data store 10 to the registers 6.

Note that if the backup data store 10 is a stack memory, then when the state saving/restoring sequence is modified by the state saving and restoring control circuitry 12 the last register value to be saved to the stack may not necessarily be the first one to be removed from the stack. Thus, the stack memory will not always be an exact last-in-first-out data structure. Nevertheless, the physical locations in which the register values are stored on the stack remain the same regardless of the temporal order in which they were saved.

Figure 4:
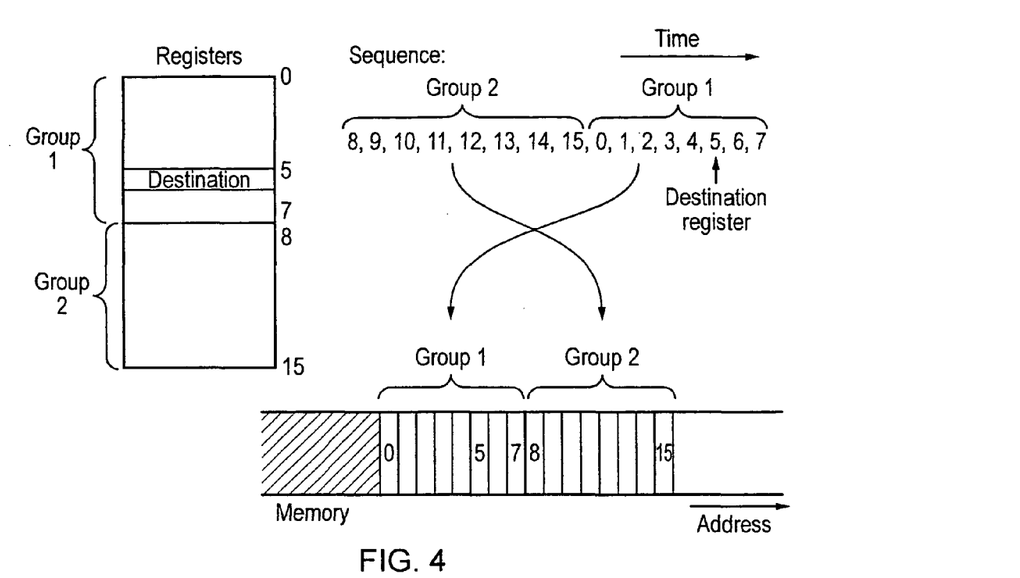
FIG. 4 shows an example technique for selecting a state saving or restoring sequence in dependence on which of two groups of registers includes a destination register.

FIGS. 4 to 7 illustrate several examples of how the state saving or restoring control circuitry 12 may select a state saving sequence or state restoring sequence in dependence on which of the registers is the destination register used by the currently executing processing operation. In FIG. 4, the registers to be saved to the backup data store 10 are divided logically into two groups. The state saving and restoring control circuitry 12 selects a sequence in which the group of registers not including the destination register (in this example, group 2) precedes the group of registers including the destination register (in this example, group 1). Thus, the register values are saved to the backup data store 10 in the temporal order shown. The registers within a group are ordered consecutively so as to simplify the selection of state saving sequence and generation of addresses in the backup data store 10. Similarly, on state restoring, the register values are restored in the temporal order shown in FIG. 4 so as to ensure that the destination register is restored after the result value has been written to the destination register. The physical order in which the register values are stored within the backup data store 10 (in this example, a stack memory) is independent of the temporal order in which they are stored. For example, irrespective of whether group 2 is saved before or after group 1, group 1 could always be stored at a lower memory address than group 2 (see the bottom part of FIG. 4). Storing the register values in the same location regardless of the temporal order in which they were stored simplifies the arrangement of the backup data store 10 and the state saving and restoring control circuitry 12 because neither of these components needs to remember which order the values were stored in. On restoration, the addresses used can be dependent on the state restoring order only, rather than having to be adjusted in dependence on the state saving sequence.

Figure 5:
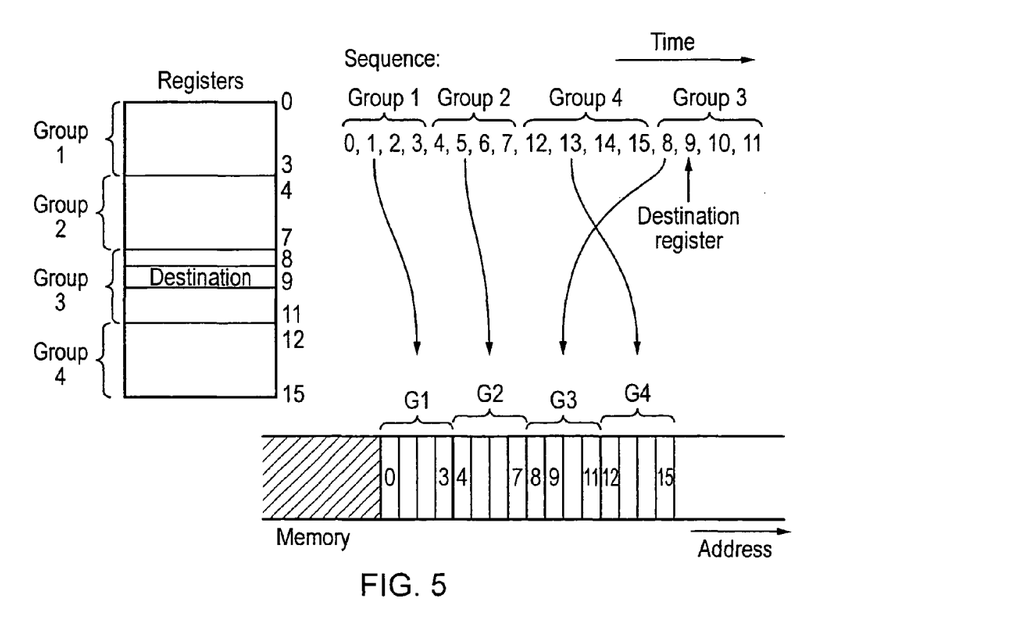
FIG. 5 shows another example of a selection of state saving or restoring sequence in which there are four groups of registers.

FIG. 5 shows another way in which the state saving or restoring sequence can be selected. In this case, the registers are grouped into more than one group, for example four groups. In the temporal order of the state saving or restoring sequence, the groups which do not include the destination register (in this example, groups 1, 2 and 4) can be placed earlier in the sequence than the group of registers that includes the destination register (for example, group 3). By providing more groups of registers, it can be ensured that the destination register has a late position in the sequence and so this can increase the amount of time available for completion of execution of the data processing operation. For example, by comparing FIG. 5 with FIG. 4, it can be seen that if the destination register is register number 9 then in the FIG. 4 example the destination register will be the tenth register in the state saving/restoring sequence, while in the example of FIG. 5 it would be the fourteenth. Thus, while having four groups of registers increases the complexity of the state saving and restoring control circuitry 12 compared with two groups, this can be useful if the data processing operation has a long enough execution time that it is helpful to ensure that the destination register always occurs in the last quarter of the state saving/restoring sequence. As in FIG. 4, the physical order in which the register values are stored in memory is independent of the temporal order and is the same regardless of which sequence is selected by the state saving and restoring control circuitry 12.

Figure 6:
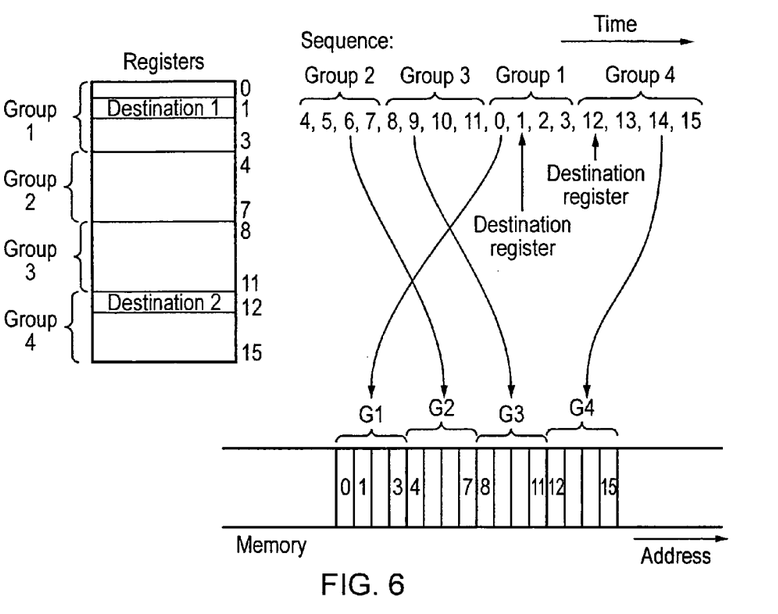
FIG. 6 shows yet another example of a selection of a state saving or restoring sequence in which there are multiple destination registers.

FIG. 6 shows a third example of selecting a state saving or restoring sequence. This technique can be useful if the data processing circuitry 4 is capable of executing multiple operations at the same time so as to generate multiple result values to be written to multiple destination registers (for example, the data processing circuitry 4 may have more than one processing pipeline 16, 20 for executing operations in parallel with one another). In this case, having more than two groups of registers is useful. For example, if two result values are respectively written to two destination registers, then four groups is useful because it ensures that there will always be at least two groups of registers that do not contain a destination register and so by placing such groups at the start of the state saving or restoring sequence it can be ensured that the destination registers have positions that are in the second half of the state saving sequence or state restoring sequence. Generally it is useful to provide more groups of registers than there are destination registers. This ensures that at least one group will not have any destination registers so can be placed at the start of the sequence. On state saving, the result values will have been written to the destination registers by the time that the value from these destination registers are written to the backup data store 10, and on state restoring, the result values are overwritten with values restored from the backup data store 10. Again, the physical order in which the register values is stored in the backup data store 10 is the same regardless of which temporal state saving or restoring sequence has been selected.

Figure 7:
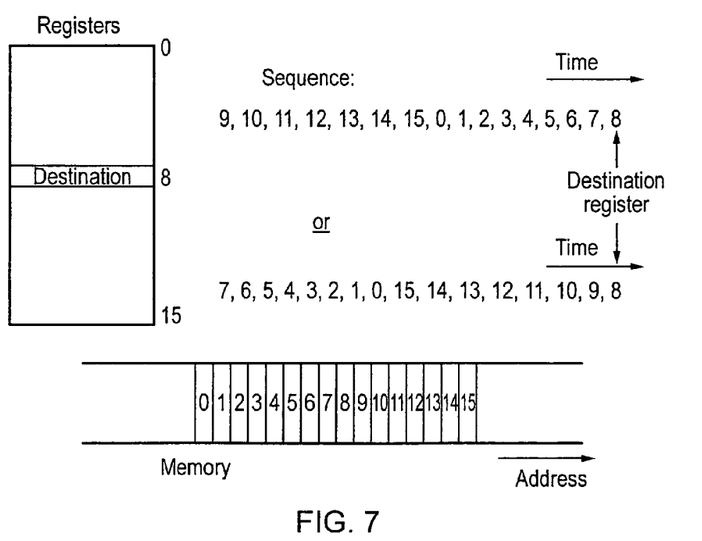
FIG. 7 shows an example of a cyclic state saving or restoring sequence.

FIG. 7 shows an example of a cyclic state saving or restoring sequence. The cyclic sequence cycles through each register in turn, and when it reaches one end of the set of registers then it goes back to the other end and continues up to the starting point. While the cyclic sequence can start and end with any register, the cyclic sequence is most useful when the sequence ends with the destination register since this provides the greatest amount of time for the pending processing operation to complete execution before the destination register is read during state saving or written to during state restoring. For example, if there are sixteen registers and register number 8 is the destination register, then a sequence starting at register 9, proceeding consecutively through the registers up to register 15, wrapping back to register 0 and continuing up to the destination register 8, may be useful. This ensures that the destination register is the last register to be saved off to the backup data store 10 and so this provides the maximum available amount of time before the currently executing data processing operation to complete before the destination register is saved off. Similarly, a cyclic sequence can be devised where the first register in the sequence is the register preceding the destination register and the order of the sequence is reversed compared to the sequence explained above (see the bottom example of a temporal sequence shown in FIG. 7).

FIGS. 4 to 7 show various sequences that can be selected by the state saving and restoring control circuitry 12. It will be appreciated that any arbitrary sequence could be devised in which any destination registers are provided with positions within the sequence that are sufficiently late to ensure that the destination register will be read from (on saving) or written to (on restoring) at a time after the result value has been written to the destination register. However, the more complex the sequence becomes, the more circuitry is required to implement the sequence. The examples shown in FIGS. 4 to 7, which are largely consecutive sequences, are much simpler to implement and achieve the objectives of preventing data dependency hazards, enabling completion of execution of the data processing operation, and providing a predictable interrupt response latency. In the case of the grouped sequences, it is only the points at which the sequence jumps from one group to another where the sequence may require non-consecutive addresses to be generated, while in the case of the cyclic sequences it is only at the point where the sequence jumps between the beginning and the end of the register bank that non-consecutive addresses are required.

FIGS. 4 to 7 show sixteen registers being written to the backup data store 10 or restored from the backup data store 10, but there may be more or fewer registers. These registers may be the whole of the register bank 6, or may be only a subset. There may be other registers whose values are not saved to the backup data store 10 on occurrence of a state saving trigger event, and to which no values are restored on occurrence of a state restoring trigger event.

Various types of events may trigger the state saving operation. For example, the occurrence of a function call instructing the processing circuitry 4 to process a new function will result in an interruption to a currently executed process. A corresponding state restoring trigger event would be the return to processing the original operation following completion of the function call. Thus, state data is stored to the backup data store 10 on occurrence of the function call. When the function call is completed, then the state associated with that process is restored to enable continued execution of the process that was interrupted by the function call.

Similarly, an interrupt request can trigger the state saving operation. The state restoring trigger event would then be the return to normal processing following the completion of the interrupt handling routine associated with that interrupt request.

Also, the present technique of reordering the temporal sequence with which register values are stored to, and restored from, the backup data store 10 may also be applied to store multiple operations and load multiple operations. A store multiple operation stores multiple pieces of data to the backup data store 10. Thus, the execution of the store multiple operation may be considered as a state saving trigger event. When the store multiple operation is executed, then by selecting an appropriate sequence for storing the multiple pieces of data to the backup data store 10, the store multiple operation may begin executing while a previous operation, which writes a result value to one of the registers from which a value is to be stored to the backup data store 10, is still being executed. Similarly, a load multiple operation may be executed to load multiple pieces of data from the backup data store 10 to the registers 6. By using the execution of a load multiple operation as a state restore trigger event, the order in which data is loaded to the registers may be controlled so that the loaded data is not overwritten by a result value of the operation which is already partially executed when the load multiple operation begins.

Figure 8:
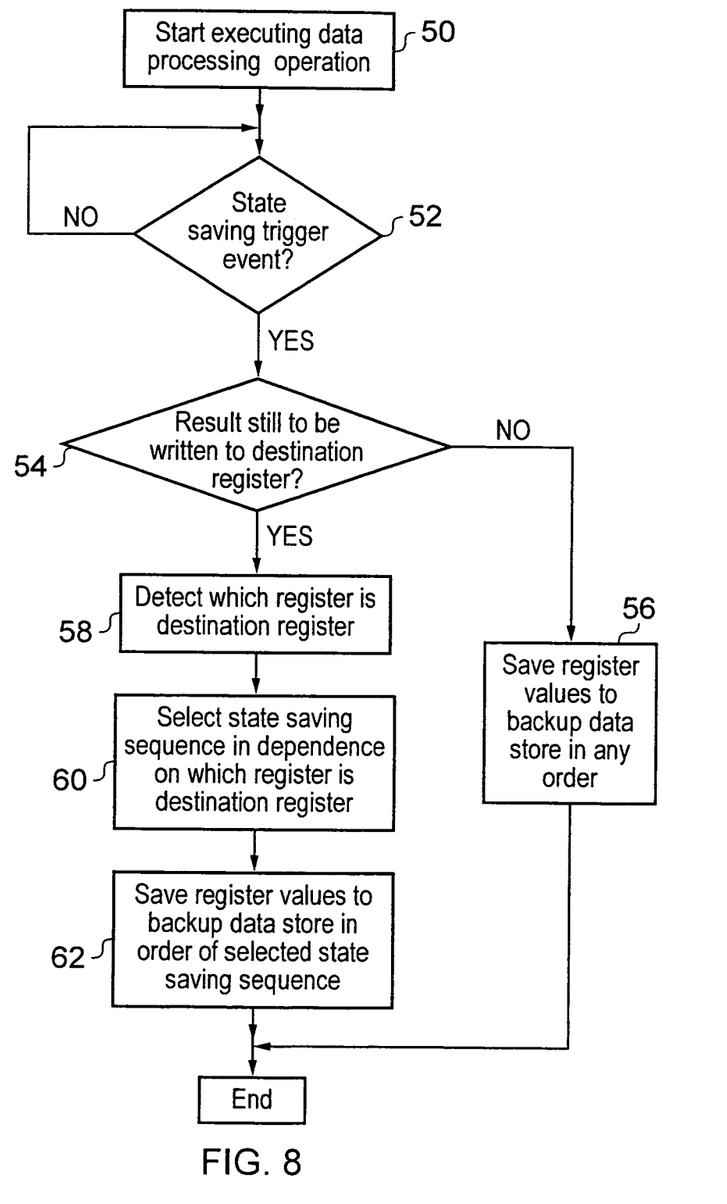
FIG. 8 illustrates a method for saving register values to a backup data store.

FIG. 8 shows a method for saving register values to a backup data store 10. At step 50, the processing circuitry 4 starts execution of one of the types of data processing operation to which the present technique is applied (in particular, floating point divide or square root operations, although other types of operations may also be used, for example multiply accumulate operations, integer divide or square root operations, double or extended precision floating point operations, trigonometric functions, or reciprocal operations). While the data processing operation of interest is being executed, at step 52 the state saving and restoring control circuitry 12 detects whether a state saving trigger event has occurred. The state saving trigger event may be, for example, a function call or interrupt request or the execution of a store multiple operation. If no state saving trigger event has occurred then the state saving and restoring control circuitry 12 continues to check whether such an event has occurred. Once a state saving trigger event has occurred during execution of the data processing operation, then the method proceeds to step 54 at which it is detected whether the result is still to be written to the destination register (i.e. a read-after-write data dependency hazard could occur). If the result has already been written to the destination register, then there is no risk of a data dependency hazard and so at step 56 the register values are saved to the backup data store 10 in any order. Since the order selected does not matter, it is simplest to store the registers in consecutive order (for a register bank having sixteen registers, the sequence could start with register 0 and continue up to register 15, for example). The register value of each register is stored to a corresponding location of the backup data store 10. The physical storage order of the register values is not dependent on the temporal order with which they are stored.

If, on occurrence of the state saving trigger event, it is determined at step 54 that the result value is still to be written to the destination register, then at step 58 the state saving and restoring control circuitry 12 detects which of the registers is the destination register for the currently executing data processing operation. Then, at step 60 the state saving and restoring control circuitry 12 selects a state saving sequence in dependence on which of the registers is the destination register. For example, one of the sequences shown in FIGS. 4 to 7 may be selected. The state saving and restoring control circuitry 12 could also select from one of a plurality of different state saving sequences so as to select the sequence in which the destination register has the latest position. After selecting a state saving sequence defining a temporal order for saving the register values to the backup data store 10, at step 62 the state saving and restoring control circuitry 12 then saves each of the register values in the sequence to the backup data store in the order of the selected state saving sequence. The locations to which the register values are written are the same as the locations to which the register values would have been written in step 56. Now that the register values are stored in the backup data store 10 then the process associated with the state saving trigger event (for example the interrupt handling routine, or the function call) may be allowed to commence.

Figure 9:
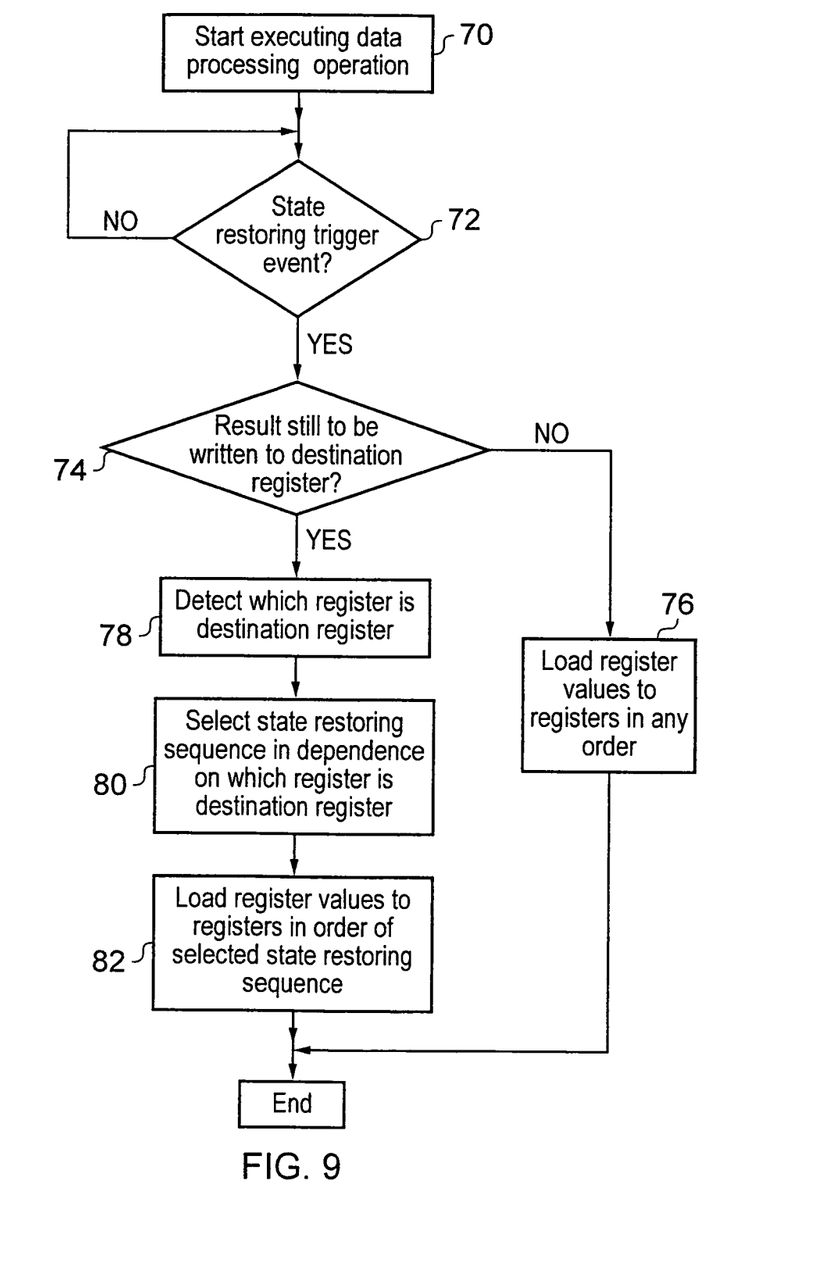
FIG. 9 shows a method of restoring register values to the registers.

FIG. 9 shows a method of restoring register state data stored in the backup data store 10. At step 70, a data processing operation starts to be executed (the data processing operation may be any of the types of operation mentioned in relation to step 50 of FIG. 8, or may be another type of operation). At step 72 it is detected whether a state restoring trigger event has occurred. A state restoring trigger event may be, for example, the return to normal processing following execution of an interrupt handler, the return from a execution of a function call, or the execution of a load multiple operation. If a state restoring trigger event has occurred, then at step 74 it is determined whether a result value of the executing data processing operation is still to be written to the destination register (i.e. a write-after-write data dependency hazard could occur). If the result value has been written to the destination register already, then the state saving and restoring control circuitry 12 loads the register values stored in the backup data store 10 to the registers 6 in any order. The temporal order in which the register values are restored will not matter because, since the result value has already been written to the destination register, there is no risk of a write-after-write data dependency hazard.

On the other hand, if at step 74 it is determined that the result value is still to be written to the destination register, then at step 78 it is detected which of the registers 6 is the destination register, and the state saving and restoring control circuitry 12 selects a state restoring sequence in dependence on which of the registers is the destination register. The selected state restoring sequence may be a type of sequence illustrated in FIGS. 4 to 7 for example, or any other type of sequence that provides the destination register with a position within the state restoring sequence corresponding to a time after the result value has been written to the destination register. Having selected a state restoring sequence defining a temporal order for loading each of the register values to the registers 6, at step 82 the register values are loaded to the registers in the temporal order defined by the selected state restoring sequence. Therefore, it is ensured that the result value is written to the destination register before the value from the backup data store 10 is restored to the destination register.

Figure 10:
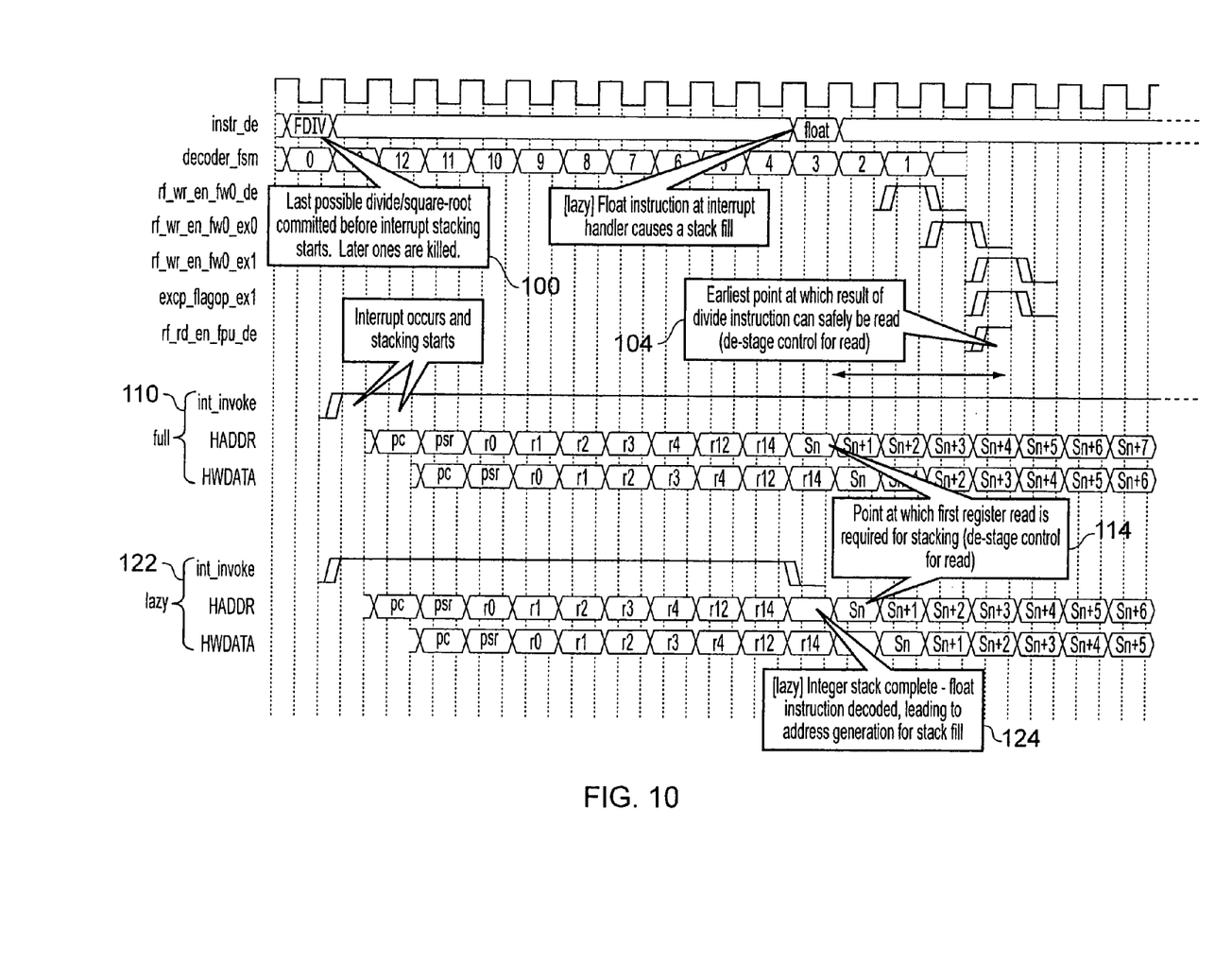
FIG. 10 is a timing diagram showing an example timing with which register values may be stored to the backup data store or restored from the backup data store.

FIG. 10 shows an example timing diagram in accordance with the present technique. In this example, a floating point divide operation is started at point 100. The floating point divide operation requires a number of processing cycles to complete execution, and so it is not until point 104 that the result of the floating point divide operation can safely be read from the destination register. This means that the temporal sequence for saving or restoring register values should be controlled so that the destination register has a position within the sequence corresponding to a time occurring after the result value has been written to the destination register (in this example, point 104).

FIG. 10 shows an example in which the interrupt signal (used in this example as the state saving trigger) occurs in the first cycle of execution of the floating point divide operation. This is the worst case scenario since if the interrupt signal occurred at a later point during execution of the floating point divide operation then execution of the divide operation would finish earlier relative to the state saving/restoring operation. The worst case scenario is when the state save/restore trigger event occurs one cycle after execution of the operation begins. It is useful to consider the worst case scenario because, as the present technique can deal with this situation, then it can also cope with any other situation.

Part 110 of FIG. 10 shows how on occurrence of the state saving trigger event (in this example an interrupt), the integer registers 6-1 (labelled pc, psr, and r0 to r14 in FIG. 10) are saved to the backup data store 10. Since it is a floating point divide operation that is executing then there is no outstanding result that is to be written to the integer registers 6-1 and so the integer registers 6-1 may be stored to the backup data store 10 in any order (for simplicity, an ascending order). After finishing the saving of the integer registers 6-1, the floating point registers 6-2 are saved to the backup data store 10. We can see how in the example of FIG. 10, the first floating point register (Sn) is saved to the backup data store 10 at a time point 114 occurring before the point 104 at which the result of the divide instruction can safely be read from the registers. By selecting the sequence in which the floating point registers 6-2 are saved to the backup data store 10, it is ensured that the destination register of the floating point divide operation is saved after the result of the divide operation has been written to the destination register. In the example of FIG. 10, the sequence shown in FIG. 4 has been used, where the registers are divided into two groups (Sm to Sm+7, and Sn to Sn+7). By setting the values of the addresses Sm and Sn to appropriate values (for example 0 and 8) in dependence on which of the registers is the destination register, then the data dependency hazard can be avoided.

For example, where the destination register is register 5, then the address Sn would be set to 8 and the address Sm would be set to 0 so that the values of the registers would be saved to the data store 10 in the order of the sequence shown in FIG. 4. A similar technique could be used for restoring the data from the backup data store 10. Thus, for this example the destination register would be at the position Sm+5 in the state saving/restoring sequence and so, as shown in FIG. 10, this value would be saved at a time point 118 which occurs after the time point 104 at which the result of the divide instruction can safely be read.

Alternatively, if the destination register is register 10, then Sn can be set to 0 and Sm can be set to 8, and then the destination register would be at position Sm+2 as shown in FIG. 10, and so again the value of the destination register would be saved to the backup data store at a time point 119 occurring after the point 104 at which the result value has been written to the destination register.

Once all of the relevant registers have been backed up to the store 10 (or restored to the registers 6), then at time 120 the first instruction of the process associated with the trigger event (e.g. an interrupt handler) can begin execution.

Part 122 of FIG. 10 shows an alternative stacking scheme known as lazy stacking. In this technique, after storing the integer registers 6-1 to the backup data store 10 the state saving and restoring control circuitry 12 can wait and begin executing the process associated with the state saving event (for example an interrupt handler) without saving the floating point register 6-2 to the backup data store 10. This is done so that in the event that the process associated with the state saving trigger event does not use any floating point register values, then the latency associated with the saving of the floating point register values can be avoided and the process can execute as soon as the integer registers have been loaded. In the worst case scenario, then the first operation of the process uses a floating point value, in which case the floating point values will need to be loaded anyway. If this is the case then the state saving sequence is selected in accordance with the present technique to prevent the result value being written to the destination register after the value of the destination register has been saved. Further details of the lazy stacking technique are explained in the co-pending UK patent application of the present applicant having application number 0910661.8, the contents of which are incorporated herein by reference.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data processing apparatus comprising:
    data processing circuitry for executing a data processing operation for generating a result value;
    a plurality of registers for storing a plurality of register values, one of said plurality of registers being a destination register for storing said result value generated during execution of said data processing operation by said data processing circuitry;
    a backup data store for storing a backup copy of a subset of said plurality of register values; and
    state saving control circuitry responsive to an occurrence of a state saving trigger event while said result value is still to be written to said destination register to:
    (i) detect which of said plurality of registers is said destination register;
    (ii) select a state saving sequence defining a temporal order for saving each of said subset of register values to said backup data store, said state saving control circuitry selecting said state saving sequence in dependence on which of said plurality of registers is said destination register to provide said destination register with a position within said state saving sequence corresponding to a time after said result value has been written to said destination register by said data processing circuitry; and
    (iii) after selecting said state saving sequence, save each of said subset of register values to said backup data store in the order of the selected state saving sequence.

2. An apparatus according to claim 1, wherein a physical order in which said subset of register values are stored in said backup data store is independent of said temporal order for saving said subset of register values defined by said state saving sequence.

3. An apparatus according to claim 1, wherein said state saving trigger event is a function call.

4. An apparatus according to claim 1, wherein said state saving trigger event is an interrupt request.

5. An apparatus according to claim 1, wherein said state saving trigger event is the execution of a store multiple operation by said data processing circuitry, at least one value to be stored being the register value of said destination register.

6. An apparatus according to claim 1, wherein at least one register other than said destination register has an earlier position in said state saving sequence than said destination register.

7. An apparatus according to claim 1, wherein said subset of registers comprise a plurality of groups of registers; and
    said state saving control circuitry is configured to provide the registers of at least one group of registers not including said destination register with earlier positions in said state saving sequence than the registers of the group of registers that includes said destination register.

8. An apparatus according to claim 7, wherein said plurality of groups of registers comprises two groups of registers.

9. An apparatus according to claim 1, wherein said data processing circuitry is for executing a plurality of data processing operations for generating a plurality of result values to be stored in a plurality of destination registers;
    said subset of registers comprises a plurality of groups of registers; and
    said state saving control circuitry is configured to provide the registers of at least one group of registers not including any of said plurality of destination registers with earlier positions in said state saving sequence than the registers of all groups of registers that include at least one of said plurality of destination registers.

10. An apparatus according to claim 7, wherein said state saving control circuitry is configured to provide consecutive registers of the same one of said groups of registers with consecutive positions in said state saving sequence.

11. An apparatus according to claim 1, wherein said selected state saving sequence is a cyclic sequence of registers ending with said destination register.

12. An apparatus according to claim 1, wherein said state saving control circuitry is hardware-controlled.

13. An apparatus according to claim 1, wherein said backup data store is a memory.

14. An apparatus according to claim 1, wherein said backup data store is a further plurality of registers.

15. An apparatus according to claim 1, wherein said data processing operation is one of a floating point divide operation and a floating point square root operation.

16. An apparatus according to claim 1, wherein said data processing circuitry comprises at least two processing pipelines for executing data processing operations in parallel with one another; and
    said data processing circuitry is configured to issue data processing operations to said at least two processing pipelines in order, but to complete execution of the issued data processing operations out of order if one of said processing pipelines executes a later-issued data processing operation more quickly than another of said processing pipelines executes an earlier-issued data processing operation.

17. An apparatus according to claim 1, wherein said plurality of registers are for storing floating point register values;
said apparatus further comprises a plurality of integer registers for storing integer register values; and
said state saving control circuitry is responsive to said state saving trigger event to save at least a subset of said integer register values to said backup data store in a temporal order independent of said state saving sequence.

18. A data processing method comprising the steps of:
executing a data processing operation for generating a result value to be stored in a destination register, said destination register being one of a plurality of registers for storing a plurality of register values; and
upon occurrence of a state saving trigger event while said result value is still to be written to said destination register:
(i) detecting which of said plurality of registers is said destination register;
(ii) selecting a state saving sequence defining a temporal order for saving each of a subset of said plurality of register values to a backup data store, said state saving sequence being selected in dependence on which of said plurality of registers is said destination register to provide said destination register with a position within said state saving sequence corresponding to a time after said result value has been written to said destination register; and
(iii) after selecting said state saving sequence, saving each of said subset of register values to said backup data store in the order of the selected state saving sequence.

19. A data processing apparatus comprising:
data processing circuitry for executing a data processing operation for generating a result value;
a plurality of registers for storing a plurality of register values, one of said plurality of registers being a destination register for storing said result value generated by said data processing circuitry;
a backup data store for storing a backup copy of a subset of said plurality of register values; and
state restoring control circuitry responsive to an occurrence of a state restoring trigger event while said result value is still to be written to said destination register to:
(i) detect which of said plurality of registers is said destination register;
(ii) select a state restoring sequence defining a temporal order for loading each of said subset of register values stored in said backup data store to said registers, said state restoring control circuitry selecting said state restoring sequence in dependence on which of said plurality of registers is said destination register to provide said destination register with a position within said state restoring sequence corresponding to a time after said result value has been written to said destination register; and
(iii) after selecting said state restoring sequence, load each of said subset of register values from said backup data store to said registers in the order of the selected state restoring sequence.

20. An apparatus according to claim 19, wherein said state restoring trigger event is a return from execution of a function call.

21. An apparatus according to claim 19, wherein said state restoring trigger event is a return from execution of an interrupt handling process.

22. An apparatus according to claim 19, wherein said state restoring trigger event is the execution of a load multiple operation where at least one value is to be loaded to said destination register.

23. An apparatus according to claim 19, wherein at least one register other than said destination register has an earlier position in said state restoring sequence than said destination register.

24. An apparatus according to claim 19, wherein said subset of registers comprise a plurality of groups of registers; and
said state restoring control circuitry is configured to provide the registers of at least one group of registers not including said destination register with earlier positions in said state restoring sequence than the registers of the group of registers that includes said destination register.

25. An apparatus according to claim 24, wherein said plurality of groups of registers comprises two groups of registers.

26. An apparatus according to claim 19, wherein said data processing circuitry is for executing a plurality of data processing operations for generating a plurality of result values to be stored in a plurality of destination registers;
said subset of registers comprises a plurality of groups of registers; and
said state restoring control circuitry is configured to provide the registers of at least one group of registers not including any of said plurality of destination registers with earlier positions in said state restoring sequence than the registers of all groups of registers that includes at least one of said plurality of destination registers.

27. An apparatus according to claim 24, wherein said state restoring control circuitry is configured to provide consecutive registers of a same one of said groups of registers with consecutive positions in said state restoring sequence.

28. An apparatus according to claim 19, wherein said selected state restoring sequence is a cyclic sequence of registers ending with said destination register.

29. An apparatus according to claim 19, wherein said state restoring control circuitry is hardware-controlled.

30. An apparatus according to claim 19, wherein said backup data store is a memory.

31. An apparatus according to claim 19, wherein said backup data store is a further plurality of registers.

32. An apparatus according to claim 19, wherein said data processing operation is one of a floating point divide operation and a floating point square root operation.

33. An apparatus according to claim 19, wherein said data processing circuitry comprises at least two processing pipelines for executing data processing operations in parallel with one another; and
said data processing circuitry is configured to issue data processing operations to said at least two processing pipelines in order, but to complete execution of the issued data processing operations out of order if one of said processing pipelines executes a later-issued data processing operation more quickly than another of said processing pipelines executes an earlier-issued data processing operation.

34. An apparatus according to claim 19, wherein said plurality of registers are for storing floating point register values;
said apparatus further comprises a plurality of integer registers for storing integer register values; and
said state restoring control circuitry is responsive to said state restoring trigger event to load said integer register values from said backup data store to said plurality of integer registers in a temporal order independent of said state restoring sequence.

35. A data processing method comprising the steps of:

executing a data processing operation for generating a result value to be stored in a destination register, said destination register being one of a plurality of registers; and upon occurrence of a state restoring trigger event while said result value is still to be written to said destination register:

(i) detecting which of said plurality of registers is said destination register;

(ii) selecting a state restoring sequence defining a temporal order for loading each of a subset of said plurality of register values stored in a backup data store to said registers, said state restoring sequence being selected in dependence on which of said plurality of registers is said destination register to provide said destination register with a position within said state restoring sequence corresponding to a time after said result value has been written to said destination register; and (iii) after selecting said state restoring sequence, loading each of said subset of register values from said backup data store to said registers in the order of the selected state restoring sequence.

\* \* \* \* \*